May 15, 1934.   H. S. VAN PATTER ET AL   1,959,071
VALVE JACKING DEVICE
Filed June 17, 1932   2 Sheets-Sheet 1

INVENTORS
HUGH. S. VAN PATTER
JOHN. C. McKEAN
BY J. F. O'Connell
ATTORNEY

May 15, 1934.  H. S. VAN PATTER ET AL  1,959,071
VALVE JACKING DEVICE
Filed June 17, 1932   2 Sheets-Sheet 2

INVENTORS
HUGH.S.VAN PATTER
JOHN.C.McKEAN
BY J.T.O'Connell
ATTORNEY

Patented May 15, 1934

1,959,071

UNITED STATES PATENT OFFICE 1,959,071

VALVE JACKING DEVICE

Hugh S. Van Patter and John C. McKean, Lachine, Quebec, Canada, assignors to Dominion Engineering Works Limited, Lachine, Quebec, Canada Application June 17, 1932, Serial No. 617,796

6 Claims. (Cl. 137—139)

This invention relates to a stem actuating mechanism designed to increase the initial force applied to move the stem in one direction as compared with the force applied to move the stem in the opposite direction; such mechanism being especially useful for opening and closing gate valves, sluice gates, and other valves or closures which have a tendency to stick in their closed positions.

In the present instance the invention will be described as applied to a gate valve equipped with a rising stem connected to a stem actuated device of the hydraulic cylinder and piston type. In such constructions the stem is usually rigidly connected to the piston so that the force applied to move the stem in a valve closing direction is somewhat greater than that applied to move the stem in a valve opening direction. Difficulty is frequently experienced in operating these valves due to the tendency of the movable gate to stick or become jammed between its seats when moved to its closed position.

According to the present invention this difficulty is overcome by connecting the stem to the piston so that the force applied to move the stem in a valve opening direction is considerably greater than the force applied to move the stem in a valve closing direction and is adequate to easily overcome any sticking or jamming of the valve in its closed position.

Proceeding now to a more detailed description reference will be had to the accompanying drawings, wherein—

Figure 1:
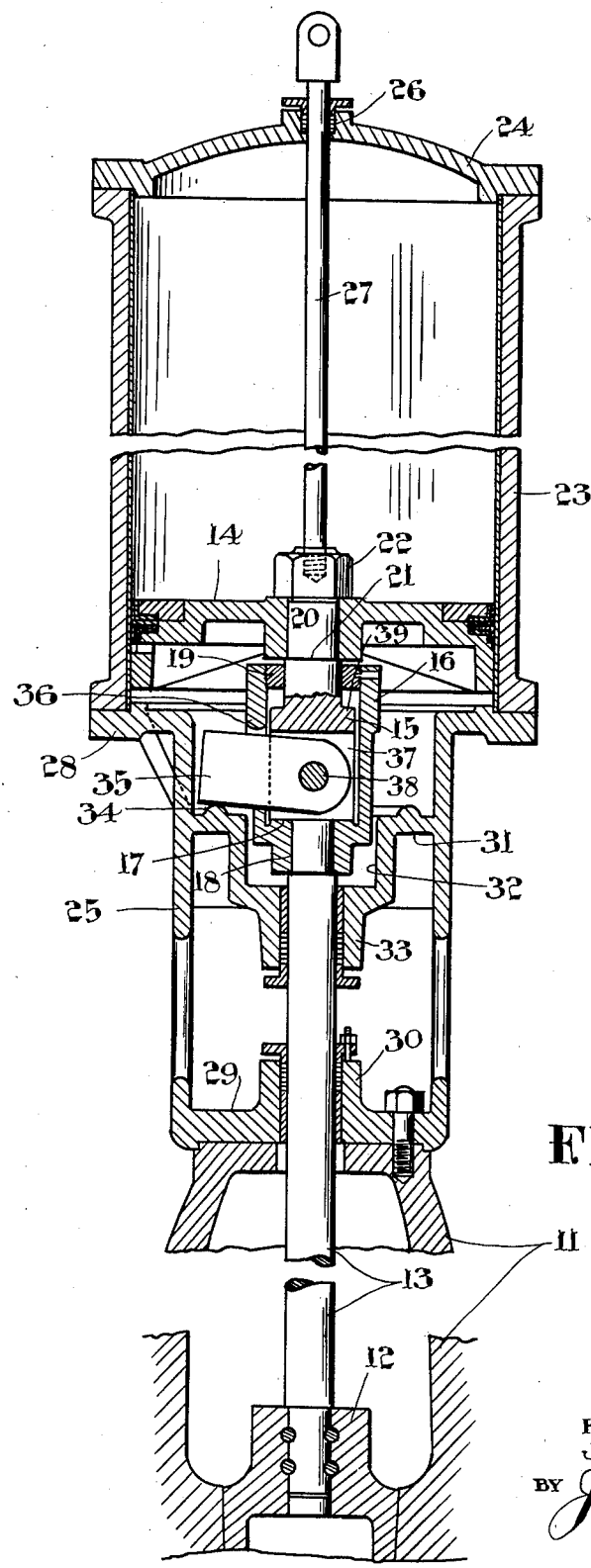
Fig. 1 is a vertical sectional view through a portion of a gate valve assembly constructed in accordance with this invention.

The gate valve assembly shown in these drawings comprises a valve casing 11; a valve gate 12; a valve stem 13; and a stem actuating piston 14. The piston 14 is rigidly attached to a block 15 mounted to have a limited sliding movement in a housing 16 fixed to the upper end of the stem 13. The housing 16 is in the form of a tubular casing having its upper end open and its lower end closed by a wall 17 having a central opening 18 in which the upper end of the stem 13 is rigidly secured. A retaining ring 19 is fitted in the upper end of said housing and serves as a guide for an extension 20 which projects upwardly from the block 15 and extends through a central opening in the piston 14. The extension 20 is herein shown as provided with a shoulder 21 to which the piston 14 is clamped by means of the clamping nut 22. The piston 14 operates in a cylinder 23 provided with removable upper and lower heads designated 24 and 25. The upper head 24 is provided with a central opening 26 serving as a guide for the upper portion of a rod 27 having its lower end fixed to the upper extremity of the extension 20. This rod 27, being raised and lowered with the piston 14, serves to indicate the position of the valve 12. The lower cylinder head 25 is in the form of a tubular casing having a flange 28 at its upper end secured to the lower end of the cylinder 23. The lower end of the cylinder head 25 is closed by a bottom wall 29 provided with a central guide bearing 30 through which the stem 13 extends. Above the bottom wall 29, the tubular head 25 is provided with an intermediate horizontal wall 31 having its central portion formed to provide a guide pocket 32 for the lower portion of the casing 16, the bottom wall of said pocket 32 being centrally apertured and formed to provide an upper guide bearing 33 for the valve stem 13. The portion of the wall 31 lying between the pocket 32 and the outer wall of the tubular head or casing 25 is formed to present an upwardly projecting annular rib 34 which serves as a fulcrum for the outer end of a lever 35. This lever 35 passes through a vertical slot 36 formed in one side of the housing 16 and has its inner end fitted in a slot 37 formed in the block 15 and mounted to swing on a pivot 38.

Figure 2:
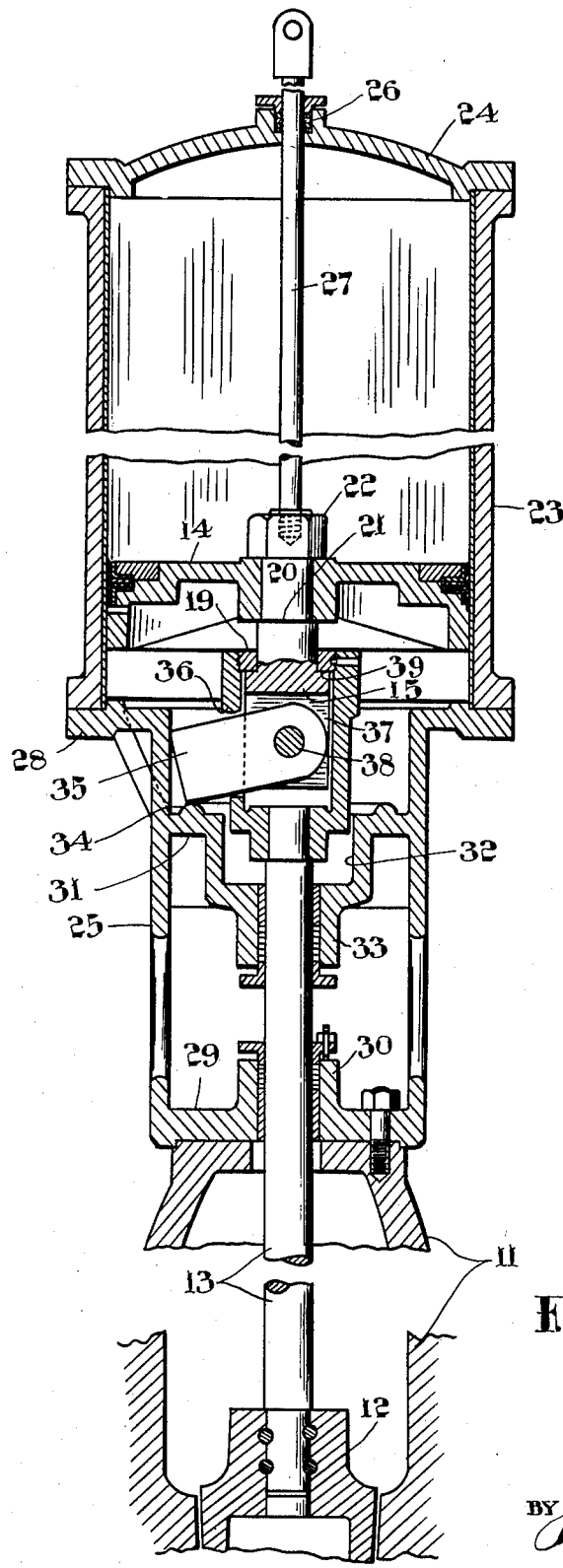
Fig. 2 is a view similar to Fig. 1 but showing the parts in a slightly different position which they occupy during the valve opening operation.

When the valve 12 is in its closed position the various parts described in the foregoing are arranged as shown in Fig. 1. To open the valve fluid pressure is admitted in the usual manner beneath the piston 14 so as to cause the piston to travel upwardly in the cylinder 23. During the initial upward movement of the piston 14 the block 15 moves independently of the housing 16 until the intermediate portion of the lever 35 is brought into engagement with the upper wall of the slot 36. During subsequent upward movement of the piston 14 the movement of the lever 35 about its fulcrum 34 causes the portion of the lever engaging the upper wall of the slot 36 to exert a lifting force on the housing 16 and the stem 13 which is sufficient to overcome any tendency of the valve 12 to stick in its closed position. As the piston continues its upward movement the shoulder 39 of block 15 is brought into direct lifting engagement with the lower surface of the ring 19 as shown to advantage in Fig. 2 so that the valve is thereafter lifted by the piston in the usual direct manner.

During the valve closing operation the downward movement of the piston 14 is directly transmitted to the stem 13 by engagement of the lower end of the block 15 with the bottom wall 17 of the housing 16. It will thus be seen that the initial force applied to the stem 13 through the lever 35 to unseat the valve is several times greater than the valve seating force which is applied to the stem by the block 15 during downward movement of the piston, so that there is little or no possibility of the automatic operation of the piston being interfered with by sticking or jamming of the valve in closed position.

Having thus described our invention, what we claim is:

1. The combination with an axially movable stem of means for actuating said stem including provision for increasing the initial force applied to move the stem in one direction as compared with the force applied to move the stem in the opposite direction, said means comprising a housing fixed to one end of the stem, a block movable in said housing, a lever passing through a slot formed in the side wall of the housing and having its inner end pivoted to said block, a fulcrum for the outer end of said lever and means attached to said block for imparting stem actuating movement thereto.

2. The combination of an axially movable stem, a housing fixed to one end of said stem, a block mounted to have a limited travel in said housing between abutment at opposite ends of the housing, a lever passing through a slot in the side wall of the housing and having its inner end pivoted to said block, a fulcrum for the outer end of the lever and a fluid actuated piston connected to said block.

3. The combination of an axially movable stem, a stem actuating member connected to said stem so as to have the capacity of limited independent movement in the axial direction of the stem, and means whereby the initial force applied to the stem when the stem actuating member is moved in one direction is greater than the force applied to the stem when the stem actuating member is moved in the opposite direction, said means including a lever having one end pivoted to the stem actuating member and having an intermediate portion disposed to engage with a portion of the stem, and a fulcrum for the free end of the lever.

4. The combination of an axially movable stem presenting axially spaced abutments, a stem actuating member mounted between said abutments so as to have the capacity of limited independent movement in the axial direction of the stem, said stem actuating member being movable into engagement with one of said abutments for moving the stem in one direction or into engagement with the remaining abutment for moving the stem in the opposite direction, and means operable by the stem actuating member for increasing the initial force applied to the stem when said member is moved in one direction as compared with the force applied to the stem when said member is moved in the opposite direction, said means functioning during the early travel of the stem actuating member towards one of said abutments and being rendered ineffective upon direct engagement between said stem actuating member and said abutment.

5. The combination of a vertically disposed axially movable stem, a housing at the upper end of said stem, a stem actuating member trapped in said housing so as to have the capacity of limited independent movement in the axial direction of the stem and means whereby the initial force applied to the stem when the stem actuating member is moved in one direction is greater than the force applied to the stem when the stem actuating member is moved in the opposite direction, said means comprising, in combination with said housing and stem actuating member, a stationary fulcrum positioned adjacent said housing, a lever having one end pivoted to said stem actuating member and the other end resting on but not attached to said fulcrum, the intermediate portion of said lever being engageable with a portion of the housing during upward movement of said stem actuating member whereby such upward movement of the stem actuating member is first transmitted to the stem through the lever and then through direct engagement between said member and the upper portion of the housing.

6. The combination of a vertically disposed axially movable stem, a housing at the upper end of said stem presenting top and bottom wall members forming axially spaced abutments, a stem actuating member mounted in the housing so as to have the capacity of limited movement between said abutments in the axial direction of the stem, a stationary fulcrum positioned adjacent said housing and a lever passing through a slot formed in the side wall of the housing and having its inner end pivoted to said member, the outer end of said lever resting on but being otherwise free of said fulcrum.

HUGH S. VAN PATTER.
JOHN C. McKEAN.